United States Patent
Jiang et al.

(10) Patent No.: US 7,911,737 B1
(45) Date of Patent: Mar. 22, 2011

(54) METHOD AND SYSTEM FOR PROVIDING A PMR HEAD HAVING AN ANTIFERROMAGNETICALLY COUPLED POLE

(75) Inventors: Hai Jiang, Fremont, CA (US); Kyusik Sin, Pleasanton, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 941 days.

(21) Appl. No.: 11/726,793

(22) Filed: Mar. 23, 2007

(51) Int. Cl.
*G11B 5/31* (2006.01)

(52) U.S. Cl. ............................. 360/125.12; 360/125.13

(58) Field of Classification Search ............ 360/125.03, 360/125.08, 125.09, 125.12, 125.13, 125.16, 360/125.19, 125.24, 125.26, 125.45, 125.46, 360/125.5, 125.51, 125.58, 125.59, 125.63, 360/125.64
See application file for complete search history.

(56) References Cited

U.S. PATENT DOCUMENTS

| | | | |
|---|---|---|---|
| 4,814,921 A * | 3/1989 | Hamakawa et al. ....... | 360/125.5 |
| 6,172,859 B1 | 1/2001 | Watanabe et al. | |
| 6,259,583 B1 * | 7/2001 | Fontana et al. ............ | 360/125.5 |
| 6,482,505 B1 | 11/2002 | Bertero et al. | |
| 6,943,996 B2 | 9/2005 | Gill | |
| 2004/0004786 A1 * | 1/2004 | Shukh et al. ............. | 360/125.12 |
| 2004/0120074 A1 * | 6/2004 | Okada et al. ............. | 360/125.12 |
| 2004/0145836 A1 | 7/2004 | Kojima et al. | |
| 2004/0150912 A1 * | 8/2004 | Kawato et al. ........... | 360/125.13 |
| 2004/0252415 A1 * | 12/2004 | Shukh et al. .................. | 360/317 |
| 2005/0013044 A1 * | 1/2005 | Hirata et al. ............. | 360/125.12 |
| 2005/0243479 A1 | 11/2005 | Gill | |
| 2006/0002015 A1 * | 1/2006 | Gill et al. ................. | 360/125.12 |
| 2006/0044680 A1 | 3/2006 | Liu et al. | |
| 2006/0119981 A1 * | 6/2006 | Li et al. .................... | 360/125.03 |
| 2007/0230044 A1 * | 10/2007 | Han et al. ................. | 360/125.04 |

OTHER PUBLICATIONS

Yasuyuki Okada, et al. "Magnetic properties of FeCo multilayered films for single pole heads", IEEE Transactions on Magnetics, vol. 40, Issue 4, Jul. 2004, pp. 2368-2370.

* cited by examiner

*Primary Examiner* — Craig A. Renner

(57) ABSTRACT

The method and system for providing a perpendicular magnetic recording (PMR) head are described. The method and system include providing a metal underlayer and a PMR pole on the metal underlayer. The metal underlayer is amorphous. The PMR pole has a bottom and a top wider than the bottom. The PMR pole includes at least a first ferromagnetic layer, a second ferromagnetic layer, and a third ferromagnetic layer. The first ferromagnetic layer is antiferromagnetically coupled with the second ferromagnetic layer. The second ferromagnetic layer is antiferromagnetically coupled with the third ferromagnetic layer.

12 Claims, 4 Drawing Sheets

METHOD AND SYSTEM FOR PROVIDING A PMR HEAD HAVING AN ANTIFERROMAGNETICALLY COUPLED POLE

BACKGROUND

FIGS. 1 and 2 depict air-bearing surface (ABS) and side views, respectively, of a conventional perpendicular magnetic recording (PMR) head 10 used in recording a PMR media (not shown). The conventional PMR head 10 is typically used as a write head in a merged head including the conventional PMR head 10 and a read head. The conventional PMR head 10 includes a conventional first pole (P1) 12, P1 pad 13, insulator 14, a first coil 15, a second pole (P2) 16, a conventional PMR pole (main pole) 18, insulator 20, write gap 22, a shield pad 24, a second coil 26, and shield 28. The conventional PMR pole 18 has a height, h, and sidewalls that form an angle, $\theta$, with the insulating layer 14. Although not explicitly shown, seed layer(s) may be used in providing the conventional PMR pole 18. In such a case, the conventional PMR pole 18 would reside on the seed layer. Although depicted as a single shield 28, it is typically composed of two portions 28A and 28B that are formed separately. The PMR head 10 is also depicted with two coils 15 and 26. However, PMR heads having a single coil may also be used.

In order to write data to a PMR media, the coils 15 and 26 are energized. Consequently, the PMR pole 18 is magnetized and the media written by flux from the pole tip 18A. Based on the direction of current through the coils 16 and 28, the direction of magnetic flux through the PMR pole 18 changes. Thus, bits having opposing magnetization can be written and the desired data stored on the PMR media. When the conventional PMR head 10 is not writing, no current is driven through the coils 15 and 26.

The conventional PMR pole 18 may be plated or may be sputtered. A plated PMR pole 18 may suffer from a reduced magnetic moment. In addition, one of ordinary skill in the art will recognize that domain lockup, also termed remanent erasure, is an issue for plated PMR pole 18. Domain lockup occurs when the conventional PMR head 10 inadvertently erases data in the PMR media even though no current energizes the PMR head 10. This occurs due to a remanent field (a field/magnetization when there is zero current through the coils 15 and 26) remaining the PMR pole 18. Stated differently, the PMR pole 18 may not completely demagnetize when in a quiescent (zero current) state. Further, the pole tip 18A is sufficiently small that such deviations of the magnetization domains in the PMR pole 18 from a completely demagnetized state may produce significant magnetization in the pole tip 18A. As a result, a high remanent field may be present in the PMR media even when no current is driven through the coils 15 and 26. This remanent field may erase data recorded on the PMR media after the head 10 passes over the media for many revolutions. Because it involves this inadvertent erasure, domain lockup is undesirable.

Domain lockup may result not only in inadvertent erasure of data, but also failure of the PMR media. The servo areas (not shown) of the PMR media are usually written at much lower linear density than the areas that store user data. Consequently, the servo areas are more subject to being erased by the remanent field of the PMR head 10. Erasure of servo areas may cause complete drive failure. Therefore, it would be highly desirable for domain lockup to be eliminated.

Sputtered conventional PMR poles 18 may provide some relief from the issues of plated PMR poles 18. Sputtered, antiferromagnetically coupled magnetic layers may be used for the conventional PMR pole 18 in an attempt to reduce domain lockup. Because of the antiferromagnetic coupling, when in a quiescent state, the remanence magnetization of such a conventional PMR pole 18 is expected to be approximately zero. A zero remanence magnetization may be achieved along the hard axis of the PMR pole 18 using antiferromagnetic materials. However, in practice, a zero remanence magnetization may be difficult to achieve along the easy axis. Furthermore, the geometry around the pole tip 18A is complex. As a result, the easy and hard axes may be switched if the combination of shape anisotropy and magnetoelastic anisotropy along the pole tip 18A is larger than the induced anisotropy. Consequently, domain lockup may still be an issue for conventional PMR heads using sputtered antiferromagnetically coupled magnetic layers for the conventional PMR pole 18.

Accordingly, what is needed is a system and method for providing a PMR head having reduced domain lockup.

SUMMARY

The method and system for providing a PMR head are disclosed. The method and system include providing a metal underlayer and a PMR pole on the metal underlayer. The metal underlayer is amorphous. The PMR pole has a bottom and a top wider than the bottom. The PMR pole includes at least a first ferromagnetic layer, a second ferromagnetic layer, and a third ferromagnetic layer. The first ferromagnetic layer is antiferromagnetically coupled with the second ferromagnetic layer. The second ferromagnetic layer is antiferromagnetically coupled with the third ferromagnetic layer.

DETAILED DESCRIPTION OF THE PREFERRED EMBODIMENTS

Figure 1:
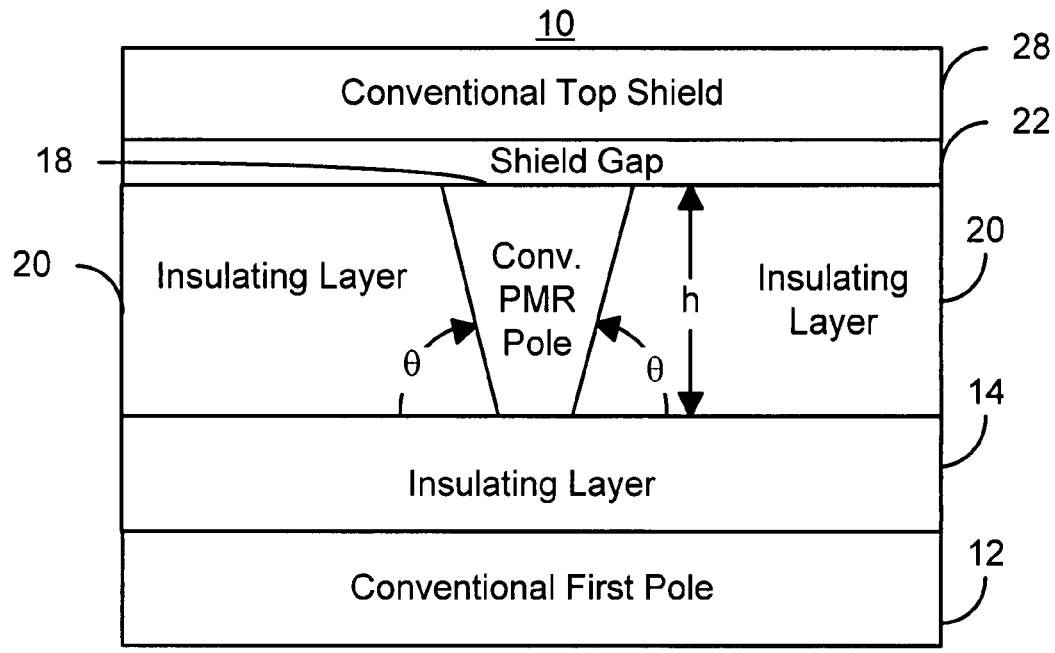
FIG. 1 depicts an ABS view of a conventional PMR.
Figure 2:
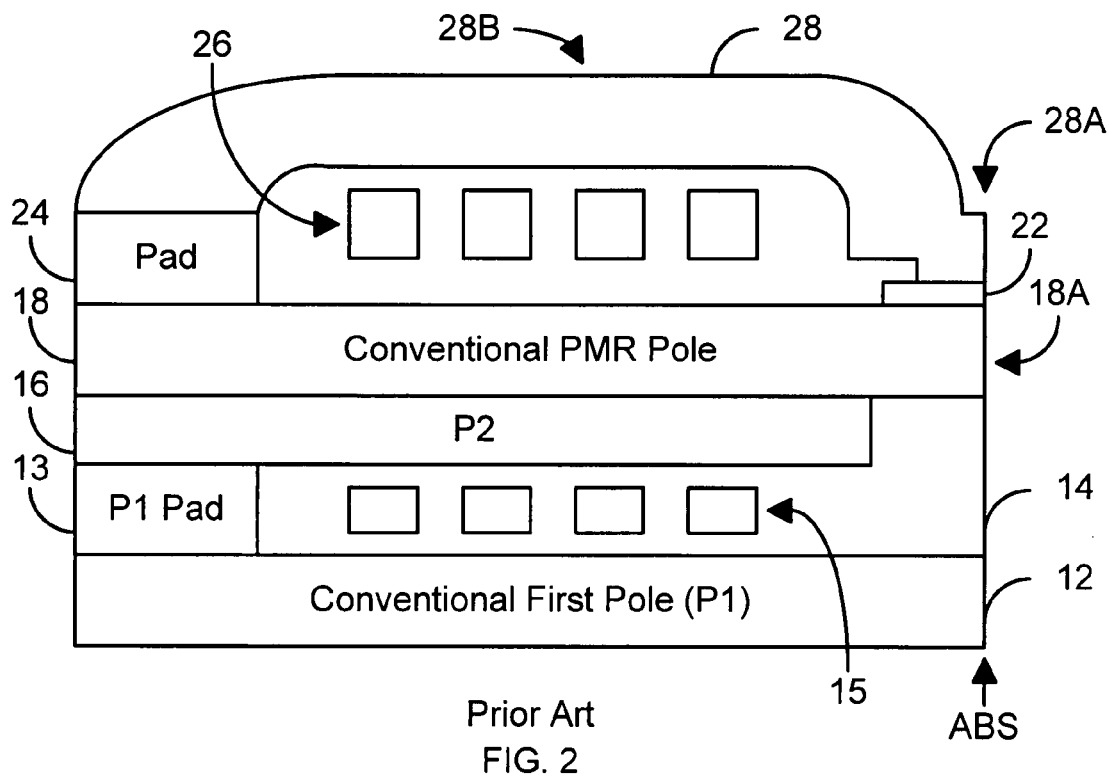
FIG. 2 depicts a side view of a conventional PMR.
Figure 3:
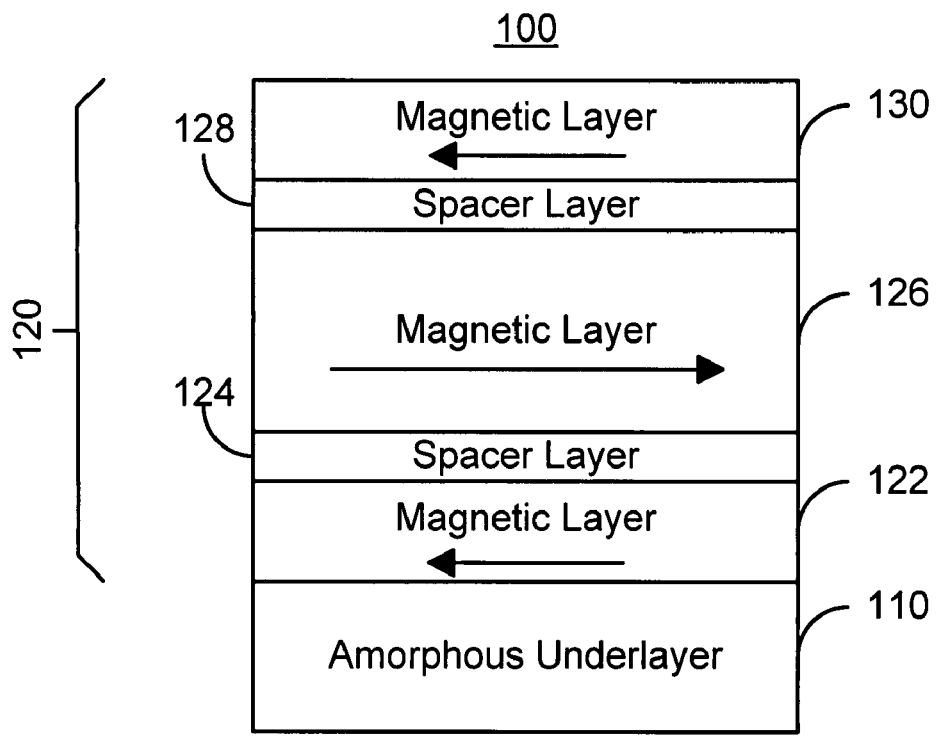
FIG. 3 is an exemplary embodiment of a portion of a PMR head.

FIG. 3 is an exemplary embodiment of a portion of a PMR head 100. The PMR head 100 is preferably used as a write head in a merged head including at least the PMR head 100 and a read head (not shown). The PMR head 100 includes an amorphous metal underlayer 110 and a PMR pole 120. The PMR pole 120 includes magnetic layers 122, 126, and 130 and nonmagnetic spacer layers 124 and 128. The PMR head 100 is configured such that the PMR pole 120 has a reduced, and preferably substantially zero, remanence magnetization. Thus, the PMR pole 120 has a substantially zero remanence magnetization along both the easy and hard axes due to the use of antiferromagnetically coupled magnetic layers 122, 126, and 130 and the amorphous underlayer 110. In particular, the magnetic layers 122, 126, and 130 within the antiferromagnetically coupled PMR pole 120 may be soft and the antiferromagnetic coupling between the layers 122, 126, and 130 may be strong. For example, in one embodiment, the PMR pole 120 has a coercivity of less than fifty Oe. In a more preferred embodiment, the coercivity of the PMR pole 120 is less than twenty-five Oe. This is accomplished not only by configuring the layers 122, 124, 126, 128, and 130, but also through the use of the amorphous underlayer 110

Figure 4:
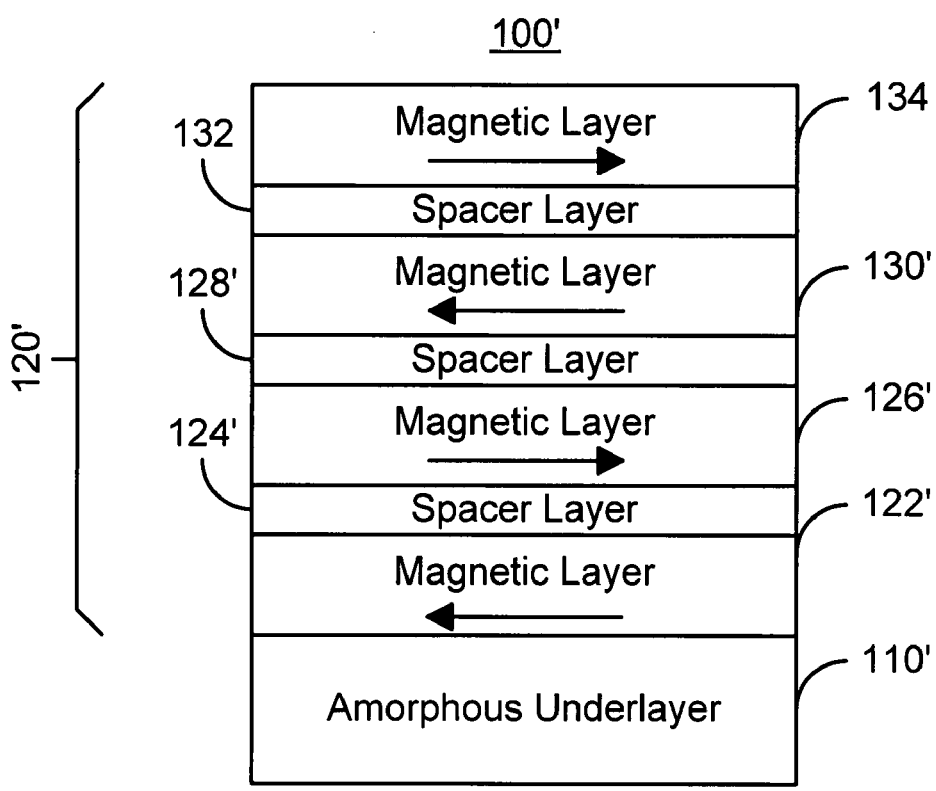
FIG. 4 is another exemplary embodiment of a portion of a PMR head.

Although the PMR pole 120 is shown as including three magnetic layers 122, 126, and 130 and two spacer layers 124 and 128, another number of magnetic layers and spacer layers may be used. Stated differently, analogous PMR poles (not shown) having a different number of antiferromagnetically coupled magnetic layers (not shown) on an amorphous underlayer (not shown) may be provided in accordance with the method and system in order to achieve similar benefits. For example, FIG. 4 depicts another exemplary embodiment of a portion of a PMR head 100' including an amorphous underlayer 110' and a PMR pole 120'. The PMR head 100' is analogous to the PMR head 100. Consequently, analogous structures are labeled in a similar manner.

In a preferred embodiment, the magnetic moments of the magnetic layers 122, 126, and 130 are configured such that when antiferromagnetically aligned, the net magnetic moment of the PMR pole 110 is zero. If material(s) having substantially the same magnetization are used, the thicknesses of the magnetic layers 122, 126, and 130 are set to ensure that the PMR pole 110 has a zero net magnetic moment when the layers 122, 126, and 130 antiferromagnetically aligned, as shown in FIG. 3. Consequently, for the PMR pole 110, if the magnetizations of the layers 122, 126, and 130 are the same, the thickness of the layer 126 is the same as the combined thicknesses of the layers 122 and 130. Thus, if both of the layers 122 and 130 have a thickness, t, then the layer 126 has a thickness of 2 t. However, in other embodiments, other thickness combinations and/or magnetizations may be used.

The metal underlayer 110 has an amorphous crystal structure and is metallic. In a preferred embodiment, the amorphous metal underlayer 110 includes at least one metal having a high melting point. Examples of high melting point metals that may be used in the amorphous metal underlayer 110 include W, Nb, Mo, Zr, and/or Ta. Thus, the amorphous metal underlayer 110 may include at least one of W, Nb, Mo, Zr, and Ta. In another embodiment, the amorphous underlayer metal 110 includes at least one of NiNb, NiZr, NiZrNb, and an alloy that includes at least one of P and B. Use of the high melting point metal and/or an alloy that includes at least one of P and B allows the amorphous underlayer 110 to have an amorphous structure when deposited, for example via sputtering. The thickness of the amorphous underlayer 110 is not less than two hundred Angstroms and not more than three thousand Angstroms. In a preferred embodiment, the amorphous metal underlayer 110 has a thickness that is not less than five hundred Angstroms and not more than one thousand Angstroms.

In a preferred embodiment, the amorphous underlayer 110 has a lower surface roughness than a base layer that would normally underlie the seed layer for the PMR pole 120. For example, such a base layer may have a surface roughness characterized by a root mean square on the order of fourteen Angstroms. In such a case, the surface roughness of the amorphous underlayer 110 may have a surface roughness characterized by a root mean square of not more than five Angstroms. However, in another embodiment, the surface roughness of the amorphous underlayer 110 may have a different relationship to the surface roughness of the base layer.

As discussed above, the PMR pole 120 preferably has a substantially zero remanence magnetization along both the easy and hard axes. It is believed that the reduced remanence magnetization may be attributed to a higher antiferromagnetic exchange coupling between the layers 122, 126, and 130 and a smaller coercivity for the layers 122, 126, and 130. It is believed that the improvement in exchange coupling and reduction in coercivity are due, at least in part, to the amorphous underlayer 110. In particular, it is believed that the reduced surface roughness provided by the amorphous underlayer 110 results in more consistent switching characteristics between the layers 122 and 130 as well as more uniform antiferromagnetic coupling between the layers 122 and 126 and the layers 126 and 130. However, the method and system described herein do not depend upon a particular functional mechanism.

Thus, the PMR pole 120 may have a reduced remanence magnetization that is preferably to close to zero. Because of this reduced remanence magnetization, a PMR head 100 incorporating the PMR pole 120 and amorphous underlayer 110 may have reduced domain lockup. Consequently, performance may be improved.

The magnetic layers 122, 126, and 130 each preferably has a high saturation magnetization and is magnetically soft. The magnetic layers 122, 126, and 130 are also antiferromagnetically exchange coupled. The nonmagnetic spacer layers 124 and 128 are preferably thin and the magnetic layers 122, 126, and 130 are strongly antiferromagnetically coupled. In addition, the spacer layers 124 and 126 are preferably metallic. In a preferred embodiment, for example, the spacer layers 124 and 128 each includes seven to nine Angstroms of Ru, and more preferably approximately eight Angstroms of Ru. Alternatively other materials such as Cr, Rh, and Cu may be used for the spacer layers 124 and 128.

In addition to the layers 122', 124', 126', 128', and 130', the PMR pole 120' includes additional spacer layer 132 and additional magnetic layer 134. The magnetic layer 134 is antiferromagnetically coupled with the layer 130' and separated from the magnetic layer 130' by the spacer layer 132. The spacer layer 132 is analogous to the spacer layers 124' and 128'. Thus, the spacer layer 132 is nonmagnetic, metallic, and preferably includes seven to nine Angstroms of Ru, and more preferably approximately eight Angstroms of Ru.

The net magnetic moment of the PMR pole 120' is preferably substantially zero when the magnetic layers 122', 126', 130', and 132 are antiferromagnetically aligned. Consequently, the net magnetic moments of the magnetic layers 122' and 130' are substantially the same as the net magnetic moments of the magnetic layers 126' and 134. If material(s) having substantially the same magnetization are used for the magnetic layers 122', 126', 130' and 134, then the sum of the thicknesses of the magnetic layers 122' and 130' are is substantially the same as the sum of the thicknesses of the magnetic layers 126' and 134. Thus, that the relative thicknesses of the magnetic layers 122', 126', 130', and 134 may be different than for the magnetic layers 122, 126, and 130. However, the magnetic layers 122', 126', 130', and 134 are still preferably configured to provide a substantially zero remanence magnetization.

The PMR pole 120' functions in an analogous manner to the PMR pole 120. Thus, the PMR pole 120' has a substantially zero remanence magnetization along both the easy and hard axes. In particular, it is believed that the reduced surface roughness provided by the amorphous underlayer 110' results in improved magnetic characteristics of the magnetic layers 122', 126', 130', and 134 and, therefore, the reduced remanence of the PMR pole 120'. Because of this reduced remanence magnetization, a PMR head 100' incorporating the PMR pole 120' and amorphous underlayer 110' may have reduced domain lockup. Consequently, performance may be improved.

Figure 5:
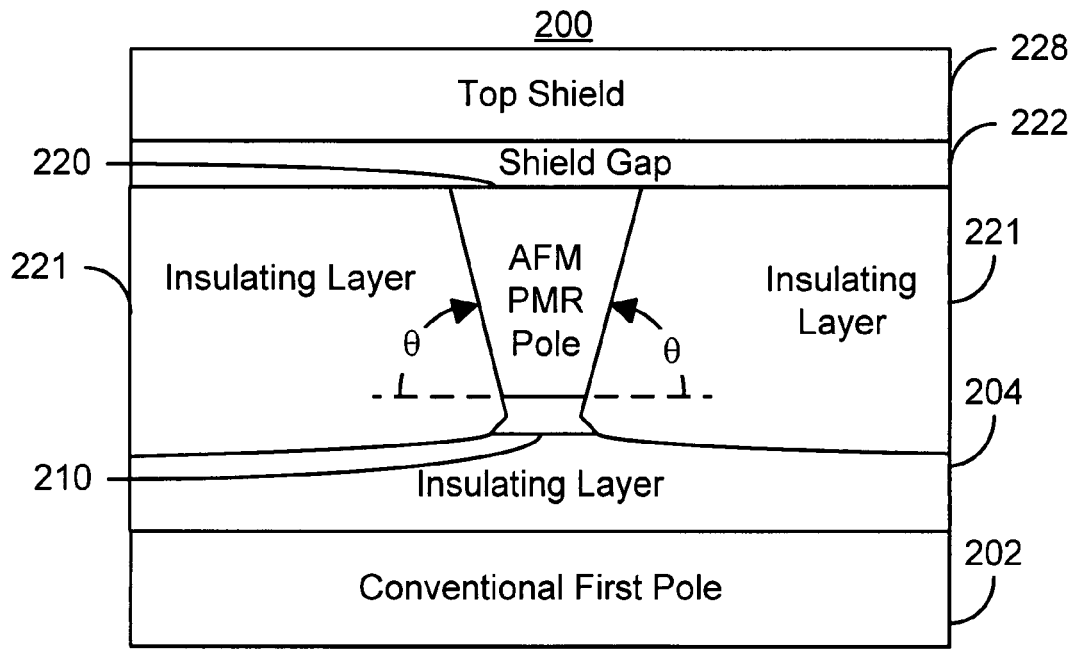
FIG. 5 is an exemplary embodiment of a PMR head, as viewed from the ABS
Figure 6:
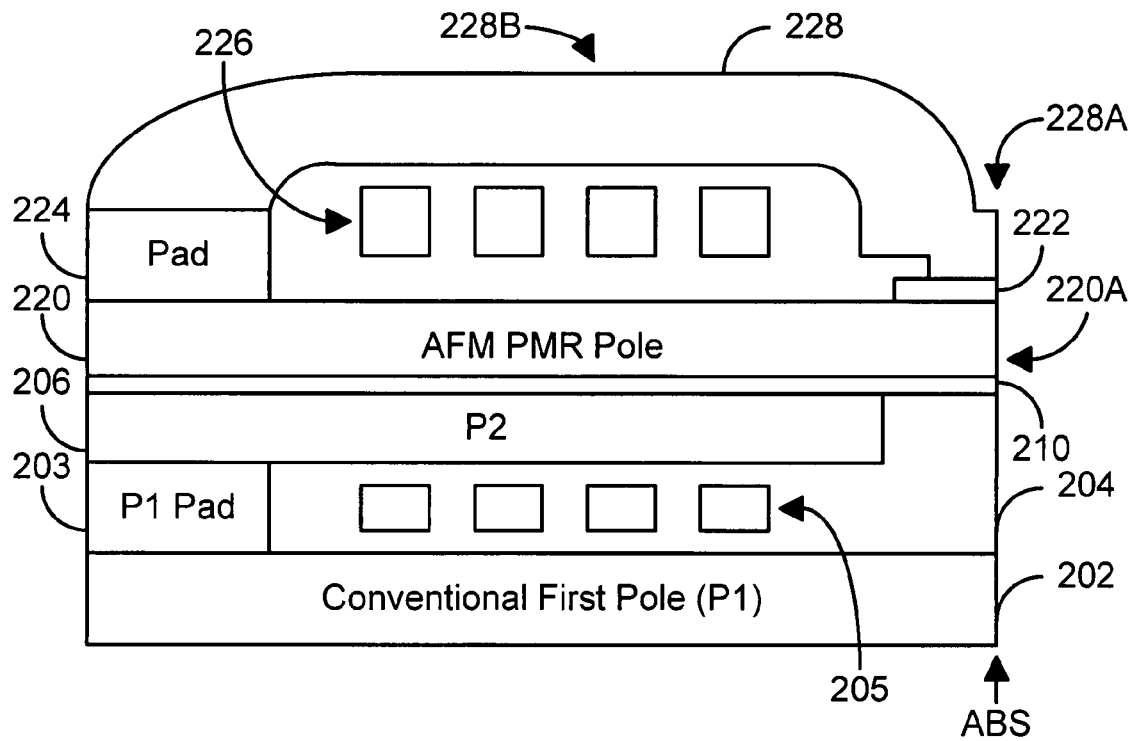
FIG. 6 is an exemplary embodiment of a PMR head, as viewed from the side.

FIGS. 5 and 6 depict an exemplary embodiment of a PMR head 200, as viewed from the ABS and the side, respectively. The PMR head 200 is analogous to the PMR head 100. The PMR head 200 is preferably used as a write head in a merged head including at least the PMR head 200 and a read head (not shown). The PMR head 200 includes a P1 202, P1 pad 203, insulator 204, a first coil 205, P2 206, an amorphous underlayer 210, an antiferromagnetically coupled PMR pole 220 formed on the amorphous underlayer 210, insulator 221, write gap 222, a shield pad 224, a second coil 226, and a top shield 228. The top shield 228, is typically composed of two portions 228A and 228B that are formed separately. Although the PMR head 200 is also depicted with two coils 205 and 226, in another embodiment, a single coil may also be used. The PMR pole 220 also has a region 220A proximate to the ABS.

The PMR pole 220 is analogous to the PMR pole 120/120'. In the embodiment shown, the PMR pole 220 sidewalls form an angle, θ, with the top surface of the amorphous underlayer 210. Consequently, the PMR pole 220 includes antiferromagnetically coupled magnetic layers (not shown) analogous to the layers 122/122', 126/126', 130/130', and 134. The PMR pole 220 thus includes nonmagnetic metal spacer layers (not shown) analogous to the spacer layers 124/124', 128/128', and 132, which alternate with and are sandwiched between the magnetic layers. For clarity, the antiferromagnetically coupled magnetic layers and nonmagnetic spacer layers are not explicitly shown.

The amorphous underlayer 210 is analogous to the amorphous underlayer 110/110'. As a result, the amorphous underlayer 210 has a surface roughness that is less than the surface roughness of the layer 204, which can be considered to be a base layer for the PMR pole 220. As a result, the PMR pole 220 has improved magnetic characteristics including a reduced magnetic layer coercivity and improved antiferromagnetic exchange coupling. Consequently, the remanence magnetization of the PMR pole 220 may be reduced, preferably to substantially zero.

Because the PMR pole 220 may have a reduced remanence magnetization, the PMR head 200 may have reduced domain lockup. Consequently, performance may be improved.

Figure 7:
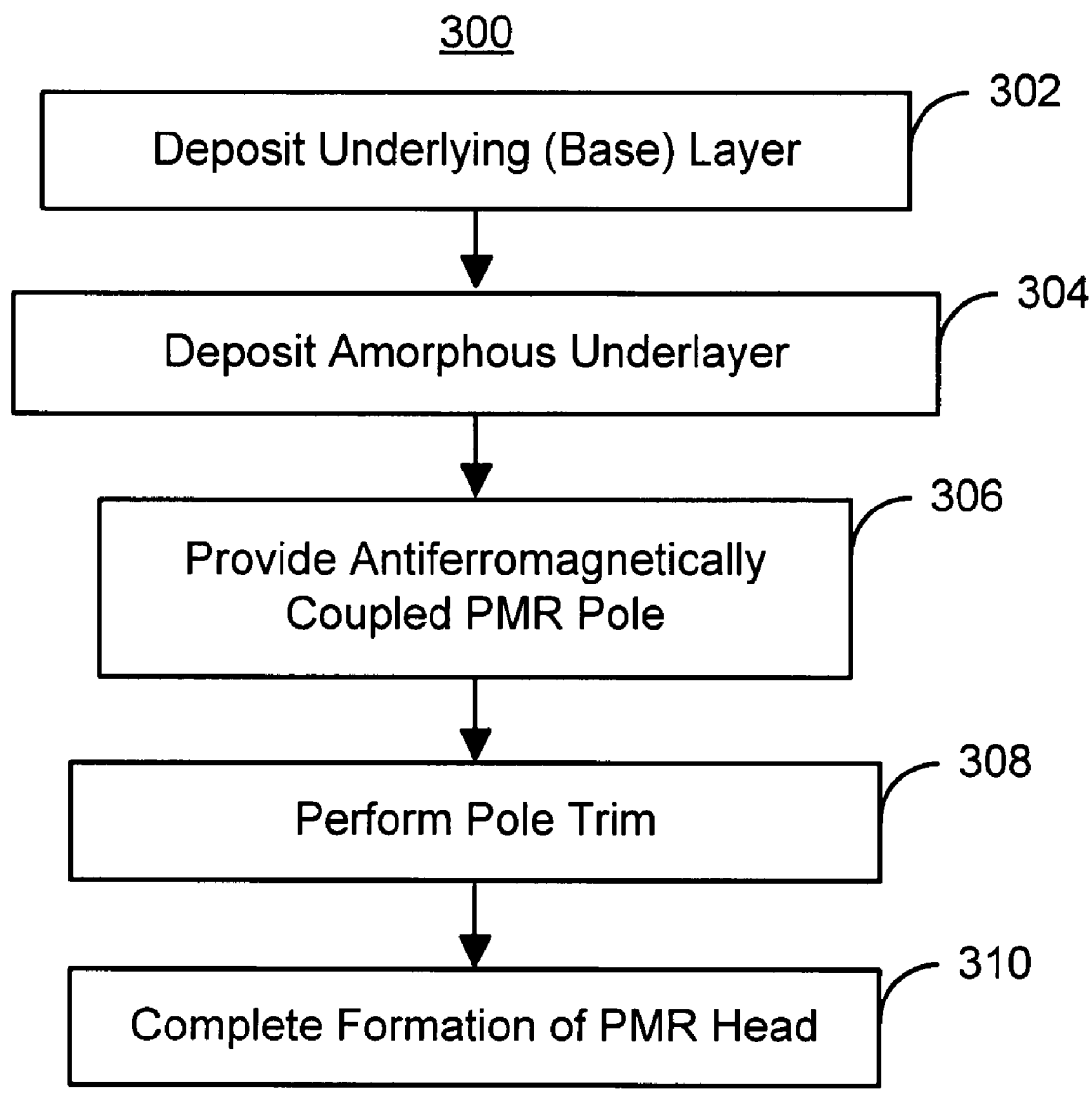
FIG. 7 is a flow chart depicting an exemplary embodiment of a method for forming a PMR head.

FIG. 7 is a flow chart depicting an exemplary embodiment of a method 300 for forming a PMR head 100/100'/200. For simplicity, steps in the method 300 may be skipped or merged. For clarity, the method 300 is described in the context of the PMR head 200. Referring to FIGS. 5-7, the method commences after the P1 202 and other portions of the PMR head 200 have been provided. Thus, an underlying, or base, layer 204 is deposited, via step 302.

The amorphous underlayer 210 is deposited, via step 304. Step 304 may include depositing at least two hundred and not more than three thousand Angstroms, In a preferred embodiment, the thickness of the amorphous underlayer 210 is at least five hundred Angstroms and nor more than one thousand Angstroms. Step 304 may also include depositing a high melting point material, for example via sputtering. Step 304 may thus include depositing at least one of W, Nb, Mo, Zr, and/or Ta. In another embodiment, step 304 may include depositing at least one of NiNb, NiZr, NiZrNb, and an alloy that includes at least one of P and B.

The PMR pole 220 is provided on the amorphous underlayer 210, via step 306. Step 306 thus includes depositing the alternating magnetic layers and spacer layers such as the layers 122/122', 124/124', 126/126', 128/128', 130/130', 132, and 134 depicted in FIGS. 3-4. In addition, because these alternating magnetic and nonmagnetic spacer layers may be blanket deposited, step 306 may include providing a mask via photolithography and defining the PMR pole 220 utilizing the mask.

A pole trim may be performed, via step 308. Step 308 may include, for example, performing ion milling at an angle. Consequently, the desired shape of the PMR pole 220 may be achieved. The amorphous underlayer 210 may be milled during the pole trim performed in step 308. Because the amorphous underlayer 210 may be soft (quickly removed) with respect to the pole trim performed in step 310, the amorphous underlayer 210 may also aid in shaping the PMR pole 220. This advantage of using the amorphous underlayer 210 for the PMR pole 220 may be more clearly seen in FIG. 5.

Fabrication of the PMR head 200 is completed, via step 310. Step 310 may thus include forming the insulating layer 221 around the PMR pole 220, the write gap 222, the pad 224, the coil 226, the top shield 228, as well as performing other processes and/or forming other structures (not shown). Consequently, the PMR head 100/100'/200 may be fabricated and the benefits thereof achieved.

Thus, the PMR heads 100, 100', and 200, and preferably formed using the method 300 may have a zero remanence magnetization along both the easy and hard axes. As a result the PMR heads 100, 100', and 200 may have reduced domain lockup. Furthermore, in at least some embodiments, the amorphous underlayer 110/110'/210 may also aid in shaping of the PMR pole 120/120'/220. Consequently, the geometry and, therefore, performance of the PMR pole 120/120'/220 may be improved.

We claim:

1. A perpendicular magnetic recording (PMR) head comprising:
 a metal underlayer, the metal underlayer being amorphous;
 a PMR pole on the metal underlayer, the PMR pole having a top and a bottom, the top being wider than the bottom, the PMR pole including at least a first ferromagnetic layer, a second ferromagnetic layer, and a third ferromagnetic layer, the first ferromagnetic layer being antiferromagnetically coupled with the second ferromagnetic layer, the second ferromagnetic layer being antiferromagnetically coupled with the third ferromagnetic layer, wherein the PMR pole further includes a first nonmagnetic layer and a second nonmagnetic layer, the first nonmagnetic layer residing between the first ferromagnetic layer and the second ferromagnetic layer, the second nonmagnetic layer residing between the second ferromagnetic layer and the third ferromagnetic layer, the first nonmagnetic layer having a first thickness such that the first ferromagnetic layer and the second ferromagnetic layer are antiferromagnetically coupled, the second nonmagnetic layer having a second thickness such that the second ferromagnetic layer and the third ferromagnetic layer are antiferromagnetically coupled; and
 wherein the first magnetic layer has a first magnetization, the second magnetic layer has a second magnetization, and the third magnetic layer has a third magnetization, the second magnetic layer being substantially a sum of the first magnetization and the third magnetization.

2. The PMR head of claim 1 wherein the first magnetic layer has first thickness, the second magnetic layer has a second thickness, and the third magnetic layer has a third thickness, the first thickness, second thickness, and third thickness being configured such that the second magnetization is substantially the sum of the first magnetization and the third magnetization.

3. A perpendicular magnetic recording (PMR) head comprising:
a metal underlayer, the metal underlayer being amorphous, wherein the metal underlayer has a first surface roughness;
a PMR pole on the metal underlayer, the PMR pole having a top and a bottom, the top being wider than the bottom, the PMR pole including at least a first ferromagnetic layer, a second ferromagnetic layer, and a third ferromagnetic layer, the first ferromagnetic layer being antiferromagnetically coupled with the second ferromagnetic layer, the second ferromagnetic layer being antiferromagnetically coupled with the third ferromagnetic layer; and
a base layer having a second surface roughness greater than the first surface roughness, the metal underlayer residing between the base layer and the PMR pole.

4. The PMR head of claim 3 wherein the second surface roughness has a root mean square of substantially fourteen Angstroms.

5. The PMR head of claim 4 wherein the first surface roughness has another root mean square of not more than five Angstroms.

6. The PMR head of claim 3 wherein the metal underlayer includes a high melting point metal.

7. The PMR head of claim 6 wherein the high melting point metal includes at least one of W, Nb, Mo, Zr, and Ta.

8. A perpendicular magnetic recording (PMR) head comprising:
a metal underlayer, the metal underlayer being amorphous; and
a PMR pole on the metal underlayer, the PMR pole having a top and a bottom, the top being wider than the bottom, the PMR pole including at least a first ferromagnetic layer, a second ferromagnetic layer, and a third ferromagnetic layer, the first ferromagnetic layer being antiferromagnetically coupled with the second ferromagnetic layer, the second ferromagnetic layer being antiferromagnetically coupled with the third ferromagnetic layer; and
wherein the metal underlayer includes at least one of NiNb, NiZr, NiZrNb, and an alloy including at least one of P and B.

9. The PMR head of claim 8 wherein the metal underlayer has a thickness of not less than two hundred Angstroms and not more than three thousand Angstroms.

10. The PMR head of claim 9 wherein the thickness is not less than five hundred Angstroms and not more than one thousand Angstroms.

11. A perpendicular magnetic recording (PMR) head comprising:
a base layer having a first surface roughness;
a metal underlayer on the base layer, the metal underlayer being amorphous and having a second surface roughness less than the first surface roughness, the second surface roughness having a root mean square of not more than five Angstroms; and
a PMR pole on the metal underlayer, the PMR pole having a top and a bottom, the top being wider than the bottom, the PMR pole including at least a first ferromagnetic layer, a second ferromagnetic layer, a third ferromagnetic layer, a first nonmagnetic layer between the first ferromagnetic layer and the second ferromagnetic layer and a second nonmagnetic layer between the second ferromagnetic layer and the third ferromagnetic layer, the first ferromagnetic layer being antiferromagnetically coupled with the second ferromagnetic layer, the third ferromagnetic layer being antiferromagnetically coupled with the second ferromagnetic layer, the first ferromagnetic layer, the second ferromagnetic layer, and the third ferromagnetic layer are configured such that the PMR pole has a substantially zero remanence magnetization.

12. A perpendicular magnetic recording (PMR) head comprising:
a base layer having a first surface roughness;
a metal underlayer on the base layer, the metal underlayer being amorphous and including at least one metal having a high melting point;
a PMR pole on the metal underlayer, the PMR pole having a top and a bottom, the top being wider than the bottom, the PMR pole including at least a first ferromagnetic layer, a second ferromagnetic layer, a third ferromagnetic layer, a first nonmagnetic layer between the first ferromagnetic layer and the second ferromagnetic layer and a second nonmagnetic layer between the second ferromagnetic layer and the third ferromagnetic layer, the first ferromagnetic layer being antiferromagnetically coupled with the second ferromagnetic layer, the third ferromagnetic layer being antiferromagnetically coupled with the second ferromagnetic layer, the first ferromagnetic layer, the second ferromagnetic layer, and the third ferromagnetic layer are configured such that the PMR pole has a substantially zero remanence magnetization;
wherein the metal underlayer has a second surface roughness less than the first surface roughness of the base layer.

* * * * *